May 18, 1965  C. PARR  3,183,598

GAUGE FOR TILE CUTTING

Filed Nov. 8, 1962  2 Sheets-Sheet 1

INVENTOR
Charles Parr
BY
Edward Greesley Bishop
ATTORNEY

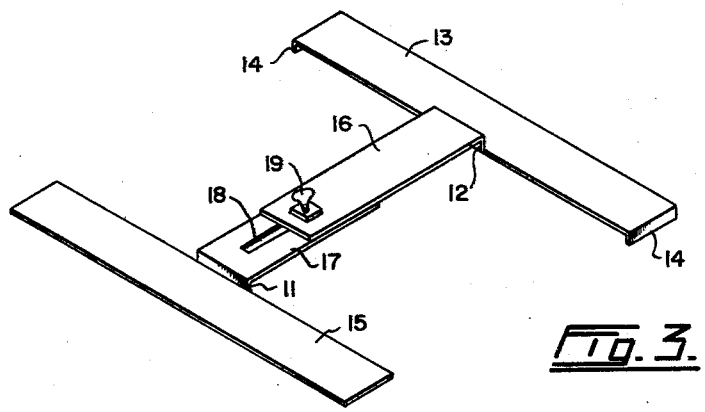
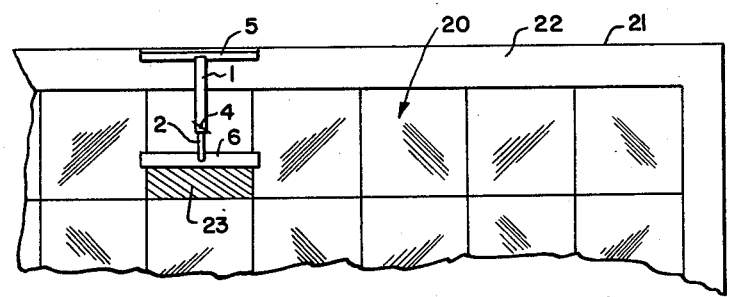
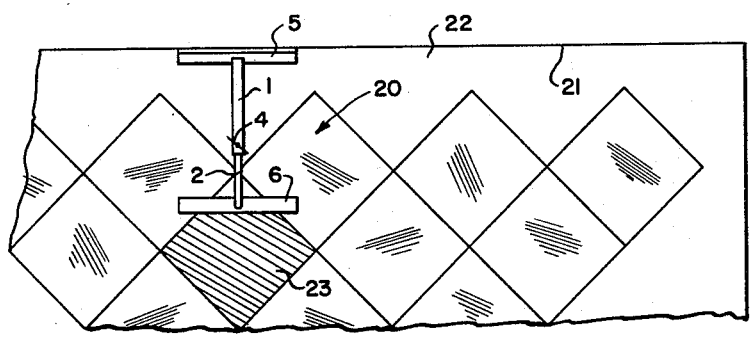

3,183,598
GAUGE FOR TILE CUTTING
Charles Parr, 10242 105 St., Edmonton,
Alberta, Canada
Filed Nov. 8, 1962, Ser. No. 236,299
1 Claim. (Cl. 33—174)

This invention relates generally to the laying of rectangular ceiling or floor tiles and particularly to a gauge that will facilitate the laying of such tile.

When tiles are laid within an enclosed area it is extremely unlikely that the dimensions of the area are such that tiles may be laid successively to the wall or other limits of the enclosure with the last tile fitting perfectly in place at such edge or wall.

Generally the space between the last laid tile and the wall is of less dimension than a standard tile and it is then necessary to cut one of the tiles to provide a tile of the correct dimensions to fit in such space.

The usual practise is to place a second tile over the last laid tile and then use a third tile to span the space between the wall and indicate a line on which the second tile may be cut. Since it is the usual practise to spread the tile cement over the floor area prior to laying the tile, it will be obvious that the use of the third tile as a marker will result in the third tile being contaminated with the tile cement and, if such cement is allowed to dry, the tile will be rendered useless.

Efforts to overcome this have resulted in a number of metal or wooden devices of the same size and shape as a regular tile which may be used for marking but these devices suffer from the disadvantage that they also rapidly become covered with the tile cement. This cement then may be transferred inadvertently to the clean tile surface and the work of the tile layer is increased in that the marking device continually must be cleaned.

Further, the tiles in most common usage are rectangular in shape in a dimension of 9 inches with a diagonal dimension of 12¾ inches. If the tiles are laid in successive rows with their edges parallel to the walls of a room, a tile gauge having a span of 9 inches is entirely satisfactory. However, if the tiles are laid diagonally or in a diamond pattern it is necessary to have a tile gauge having a dimension of 12¾ inches if such gauge is to be used.

Additionally, in laying tile, it is necessary, in many instances to fit the tile around pipes and the like. With conventional gauges, this is an extremely difficult operation and frequently tiles are mismarked or cut and therefore ruined. With my improved gauge, it is possible to position the marking and abutting straight edges close to the pipe and thereby obtain accurate measurements quickly and easily.

I have provided a simple low cost, light weight gauge including a telescoping handle whereby the straight edges on the gauge may be adjusted to either a 9 or 12¾ inch span as required in tile laying. In addition, I have formed my device so that the area of my device in contact with the tile cement will be at an absolute minimum to reduce the inadvertent transference of any cement to the device and to lessen the necessity for periodic cleaning.

In drawings, illustrating a preferred embodiment,

FIG. 3 is an isometric view illustrating a still further form.

FIG. 4 is a broken away diagrammatic view showing the device in use, with tiles laid in one pattern.

FIG. 5 is a broken away diagrammatic view showing the device in use with the tiles laid in a diagonal pattern.

Figure 1:
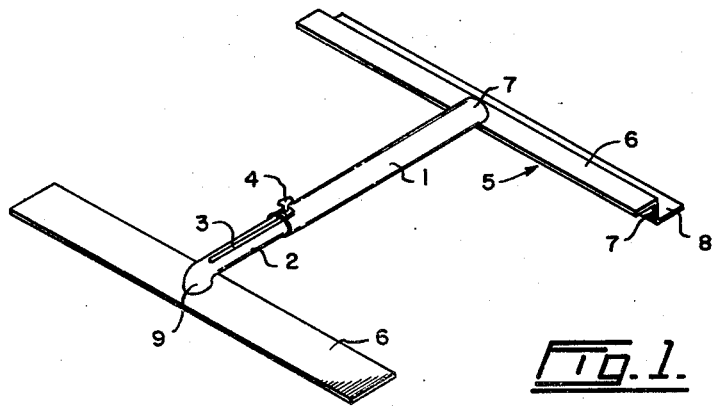
FIG. 1 is an isometric view showing the preferred form of my device.

As illustrated in FIG. 1 in the drawings, the preferred form of my tile gauge comprises a telescoping handle consisting of the tubular section 1, and the section 2 which is preferably of solid construction and fitted slidably into the section 1. It should be noted that the section 2 is flattened as illustrated at 3 along its top edge and a thumb screw 4 through the member 1 engages with the flattened portion 3 to hold the portions 1 and 2 in any desired adjusted relationship.

Straight edges are fixed at the outer ends of the members 1 and 2, the straight edge 5 secured to the member 1 known as an abutting straight edge and the straight edge 6 secured to the member 2 known as a marking straight edge. It should be noted that the straight edge 5 is formed with a shelf 6, with a wall 7 extending down from the shelf 6 and a foot 8 projecting from the bottom edge of the wall 7 and away from the shelf 6. The projecting foot 8 exhibits a minimum area for contact with any tile cement and it will be obvious that the tile layer will be able to keep the foot clean with little difficulty.

It should also be noted that the end 9 of the member 2 is formed downwardly prior to it's connection to the straight edge 6 so that the telescoping handle will be substantially parallel to any surface on which the device is placed.

The straight edges 5 and 6, in the preferred embodiment of my device, are constructed in the same width in order that the device may be positioned to embrace a pipe or other object projecting from a floor and after a mark has been made, it is only necessary to scribe a second parallel mark spaced the width of one straight edge to designate a cutting line of the correct distance.

Figure 2:
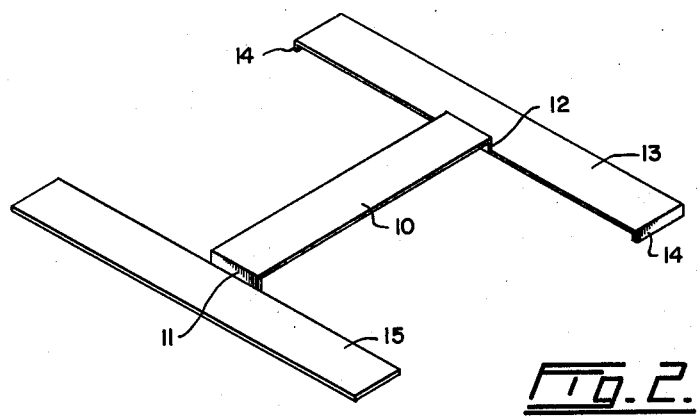
FIG. 2 is an isometric view illustrating an alternate form.

In the alternative embodiment illustrated in FIGURE 2 a handle 10 is formed downwardly at 11 and 12 at its ends with an abutting straight edge 13 secured to the portion 12. The abutting straight edge 13 is formed downwardly at its ends 14 so that the straight edge will be raised from any surface on which it is placed. A marking straight edge 15 is secured to the downwardly formed end 11 and the straight edges 13 and 15 are substantially parallel.

In the embodiment illustrated in FIGURE 3 the straight edges 13 and 15 are identical to those illustrated in FIGURE 2, the handle however being formed in two parts, 16 and 17, with longitudinal slots 18 therein and an adjusting screw 19 to secure the handle in any adjusted position.

In operation and with reference to FIGURES 4 and 5 in the drawings, FIGURE 4 illustrates tiles designated generally at 20 laid in successive rows within an enclosure 21 and with a space 22 left between the last row of tiles and the wall of the enclosure. To cut a piece of tile to fit in the space 22, it is only necessary to lay a second tile on top of one of the tiles 20, place the straight edge 5 against the wall 21 and then draw a line along the second tile where indicated by the marking straight edge 16. Such a tile portion is shown in heavy shading designated at 23.

As illustrated in FIGURE 5 the tiles 20 are laid in a diamond form to leave a space 22 differing from the space 22 as shown in FIGURE 4 but it is only necessary in this case to extend the straight edges 5 and 6 to the diagonal dimension of the tile or 12¾ inches and to then use it exactly as before, to make a portion 23 of the tile to be cut.

When using this device, it will be found that the projecting foot 8 may be utilized when fitting tile underneath a baseboard or the like, in that the foot may be inserted beneath the baseboard to determine the correct width of the tile that is needed.

What I claim as my invention is:

In a gauge for marking a cutting line on tiles when laying tile of known dimensions on a surface, such gauge having a telescoping handle member and means to secure the member in an adjusted position, a marking straight edge fixed substantially centrally at one end of the handle member and an abutting straight edge substantially centrally at the opposite end of the handle member, such abutting straight edge consisting of a shelf to which the end of the handle member is attached, a substantially vertical wall extending downwardly from the shelf and a foot projecting from the lower edge of the wall member and away from the shelf, such foot being of a thickness capable of insertion between the lower edge of the base board and a floor surface on which the tile is to be laid and whose area is the only contact of the abutting straight edge with the surface on which the tile is to be laid.

References Cited by the Examiner
UNITED STATES PATENTS

| | | | |
|---|---|---|---|
| 1,019,936 | 3/12 | Ware | 33—180 |
| 1,329,337 | 1/20 | Eggleston | 33—98 |
| 1,864,096 | 6/32 | Schenkein | 33—107 |
| 2,647,322 | 8/53 | Eliason | 33—98 |
| 2,716,288 | 8/55 | Geddis | 33—188 |

ISAAC LISANN, *Primary Examiner.*

ROBERT B. HULL, *Examiner.*